Figure 1:
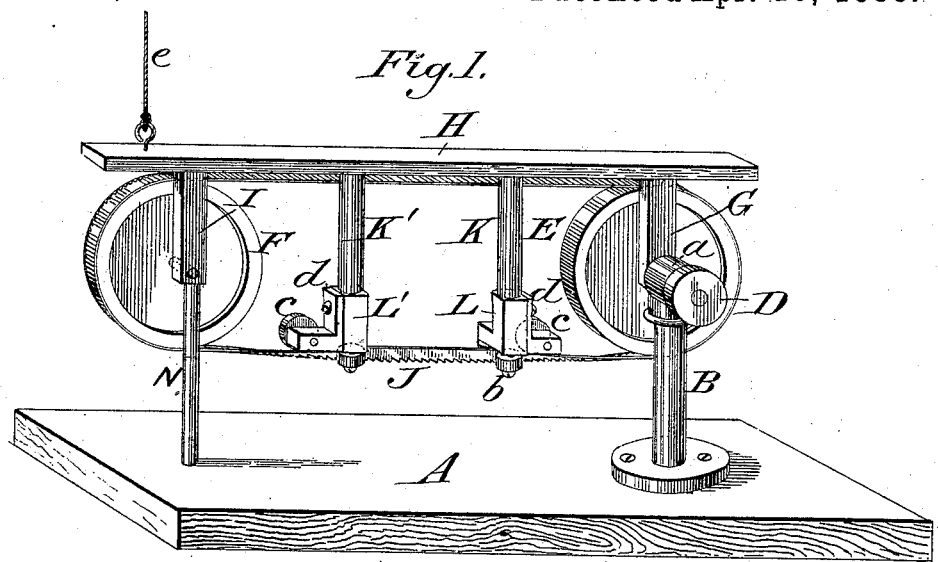

(No Model.)

C. BRYANT.
BAND SAWING MACHINE.

No. 380,857. Patented Apr. 10, 1888.

Witnesses.
F. H. Schott
Fred E. Tasker

Inventor.
Calvin Bryant
By his Attorney John C. Tasker

UNITED STATES PATENT OFFICE.

CALVIN BRYANT, OF KEENE, NEW HAMPSHIRE, ASSIGNOR OF ONE-HALF TO SAMUEL C. KEELER, OF SAME PLACE.

BAND SAWING-MACHINE.

SPECIFICATION forming part of Letters Patent No. 380,857, dated April 10, 1888.

Application filed December 17, 1886. Serial No. 221,876. (No model.)

*To all whom it may concern:*

Be it known that I, CALVIN BRYANT, a citizen of the United States, residing at Keene, in the county of Cheshire and State of New Hampshire, have invented certain new and useful Improvements in Band Sawing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that class of sawing-machines known as "band-saws," by which they are adapted to operate as crosscut-saws in the manufacture of lumber of lath, hoop, shingle, and stave and pulp bolts, and other articles which are produced by first cross-cutting the log or timber into suitable lengths.

Heretofore it has been considered as impracticable to employ the band-saw for the purpose of cross-cutting, notwithstanding the fact that it was desirable to do so, on account of the rapidity of its action, small amount of power required to operate it by reason of the thin blade of the saw compared with other saws required to do the same work, and the smoothness of the severed surfaces.

Although I am aware that in some instances a swinging frame has been employed, yet in the band sawing-machines now in general use the saws are commonly mounted on stationary fixtures, the saw-blade running over two pulleys, one of which acts as a driver and the other as a guide and tightener. Both parts of the blade between the pulleys being in substantially the same plane renders it impossible to cut a bolt longer than the diameter of the pulleys upon which the saw runs. Again, as the saw was carried by stationary fixtures, it became necessary to feed the log or other material operated upon to the saw, which in the manufacture of the articles above named would be very inconvenient, if not practically impossible. To avoid these objection I construct my machine by carrying only one of the pulleys (namely the driver) in stationary fixtures, the other being carried by a frame which swings upon the drive-shaft as a pivot, so that the saws may occupy either a horizontal or vertical position or swing to any desired point of a circle having the driving-shaft as its center; and, further, in order to bring the cutting portion of the saw-blade into a position at right angles to that portion of the same blade which is not in use for cutting, I attach to the swinging frame suitable guide-rollers, between which the saw-blade passes, and which give it a quarter-turn, thus causing the cutting-teeth of that portion of the blade employed in making the cut to project outwardly, said portion being in the same plane as the pulley. A material advantage in moving the saw instead of the log lies in the fact that the saw is prevented from binding.

My invention therefore consists in a band-saw carried on a swinging frame, which frame is provided with guides that turn the cutting portion of the saw at an angle to the remainder, and in certain details of construction hereinafter fully described and claimed.

Figure 2:
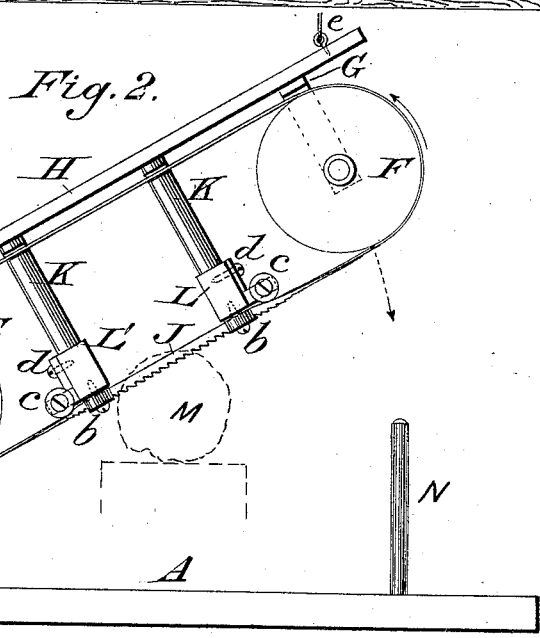
Figure 3:
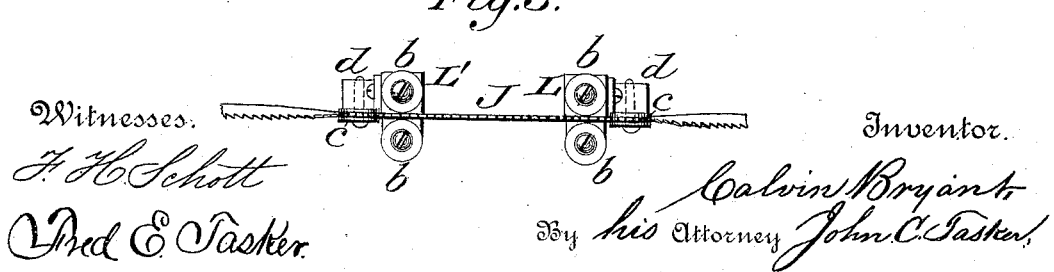

In the accompanying drawings, which illustrate one form of the machine, Figure 1 is a perspective view showing the general arrangement of parts. Fig. 2 is a side elevation showing the machine in the act of cutting through a log. Fig. 3 is a detail illustrating the arrangement of the guides by which the cutting part of the saw is turned to a right angle with relation to the part which passes over the pulley.

In describing these figures, A represents the base upon which the operative parts are carried. B is a standard secured to the base in any suitable manner, and carrying the journal-bearing $a$, in which the driving-shaft $c$ revolves. This shaft receives motion through a belt from any suitable prime motor running upon the pulley D, secured upon one end of said shaft, its opposite end carrying the driving saw-pulley E. Upon the shaft C, between the pulley E and journal-bearing $a$, is journaled the standard G, firmly secured to and carrying the bar H. This bar forms the rigid portion of the swinging frame which sustains the strain of the saw, and is provided at the opposite end from the standard G with another standard, I, carrying the saw-pulley F, which standard may be provided with devices for increasing or decreasing the distance between the pulleys E and F in order to keep the saw J, which passes around said pulleys, in a proper state of tension.

Securely attached to the bar H between the saw-carrying pulleys are two arms, K K', said arms being provided at their outer ends with guides-blocks L and L'. These guide-blocks carry the guide-rollers b b upon their outer face, said rollers turning preferably upon adjustable pivots, so that the periphery of the rollers may be kept in close proximity to the saw-blade. It will be seen that the axis of these guide-rollers is at right angles to that of the saw-pulleys, so that the saw-blade in passing between the guide-rollers is turned with its teeth outward, enabling it to cut in a plane at right angles to what it would if not deflected by the guide-rollers. An additional roller, c, is secured by an adjustable bracket, d, to each of the guide-blocks L L', the object of which is to assist in giving the proper turn to the saw-blade and relieve the guide-blocks from the excessive pressure of the same when in cut.

The operation of the machine will be understood from an inspection of Fig. 2 of the drawings, in which M represents a log placed upon a carriage having an endwise movement at right angles to the line of travel of the saw, so that as each bolt is cut from the log the latter may be moved forward a distance equal to the length of the next bolt to be cut; or any other suitable support may be used for the log. While the log is being placed in position the saw-frame and saw are raised into an inclined position by means of the rope e or other suitable device attached to the frame. After the log is in position and the saw put in motion the frame is lowered, the saw comes in contact with the log and cuts its way through it, when the further descent of the frame may be arrested by its coming in contact with the post N, placed in a suitable position to receive it, and upon which it rests until again raised to advance the log.

Having thus described my invention, I claim as new, and desire to secure by Letters Patent, the following:

1. As an improvement in band sawing-machines, the combination, with a vertically-swinging frame carrying the saw, located transversely to the log and movable toward and away from the same, of saw-pulleys mounted in said frame, a saw-blade carried by the pulleys, and guide-rollers arranged in proximity to the blade with their axes at an angle to that of the pulleys, so that the cutting portion of the blade may be turned to an angle with relation to that portion of the blade upon the pulleys, substantially as described.

2. As an improvement in band sawing-machines, a vertically-swinging frame carrying the saw pivoted upon the driving-shaft, said frame being placed transversely to the log and provided with guide-carrying arms and guide-rollers, which latter lie in a plane at right angles to the plane of movement of the frame, in combination with the saw-blade and its carrying-pulley, all arranged and operating to drive the saw and so guide the same that its cutting portion shall be deflected at a right angle to the remainder of the blade, substantially as described.

3. In a band sawing-machine, the combination of the swinging frame located transversely to the log and movable toward and from it, the supporting-standards for the frame, guide-arms and the saw-guides arranged in close proximity to the saw, with their axes at right angles to those of the saw-pulleys, the saw-pulleys and saw-blade carried thereby, whereby said saw-blade has its cutting portion turned into the plane of movement of the saw-frame and at a right angle with that portion of the blade upon the pulleys, substantially as and for the purposes specified.

4. In a band sawing-machine, the standard B, provided with a journal-bearing, a, and the driving-shaft C, carrying pulleys D and E, in combination with the swinging frame located transversely to the log and movable toward and away from the same, pulley F, saw-blade J, and guide-rollers b c, in close proximity to the blade and attached to guide-blocks L L' for the purpose of turning and guiding said saw-blade so that its cutting portion will lie in the plane of movement of the saw-frame, said rollers b lying in a plane at right angles to that of the pulleys, while rollers c lie in the same plane as the pulleys, substantially as described.

In testimony whereof I affix my signature in presence of two witnesses.

CALVIN BRYANT.

Witnesses:
HIRAM BLAKE,
ADOLPH PRESSLER.